(12) United States Patent
Yao

(10) Patent No.: US 7,684,087 B2
(45) Date of Patent: Mar. 23, 2010

(54) BITMAPPED BASED TRAPPING

(75) Inventor: Meng Yao, West Linn, OR (US)

(73) Assignee: Xerox Corporation, Norwalk, CT (US)

( * ) Notice: Subject to any disclaimer, the term of this patent is extended or adjusted under 35 U.S.C. 154(b) by 987 days.

(21) Appl. No.: 11/399,245

(22) Filed: Apr. 6, 2006

(65) Prior Publication Data

US 2007/0236740 A1    Oct. 11, 2007

(51) Int. Cl.
H04N 1/409    (2006.01)
H04N 1/60     (2006.01)
G06T 5/30     (2006.01)

(52) U.S. Cl. .................. 358/3.26; 358/534; 358/1.9

(58) Field of Classification Search .............. 358/1.9, 358/2.1, 2.99, 3.01, 3.02, 3.03, 3.04, 3.05, 358/3.06, 3.13, 3.14, 3.15, 3.24, 3.26, 443, 358/448, 462, 500, 501, 502, 503, 504, 515, 358/524, 530, 534, 536, 538; 101/171, 211, 101/483, 485; 347/15, 112, 115, 116, 171, 347/172; 382/162, 167; 399/299, 301
See application file for complete search history.

(56) References Cited

U.S. PATENT DOCUMENTS 5,923,821 A    7/1999    Birnbaum et al.
6,738,159 B2    5/2004    Harrington
6,798,540 B1 *    9/2004    Kritayakirana et al. ....... 358/1.9
2004/0239967 A1 *    12/2004    Wen .......................... 358/1.9

FOREIGN PATENT DOCUMENTS

| EP | 0 160 526 B1 | 10/1990 |
| EP | 0 322 680 B1 | 9/1995 |
| EP | 0 484 890 B1 | 4/1998 |
| WO | WO 2005/053308 A | 6/2005 |

OTHER PUBLICATIONS

European Patent Office Search Report for Application No. EP 07 10 5733, mailed Nov. 7, 2007.

* cited by examiner

Primary Examiner—Mark K Zimmerman
Assistant Examiner—Peter L Cheng
(74) Attorney, Agent, or Firm—Fay Sharpe LLP

(57) ABSTRACT

A bitmap based trapping method that extends the dot pattern of a lighter color into a darker color is disclosed. For selected pixels with the darker color and not the lighter color, correspondingly located pixels in neighboring halftone cells are identified. If any of these correspondingly located pixels contains the lighter color and not the darker color, the lighter pixel is added to the selected pixels.

20 Claims, 5 Drawing Sheets

BITMAPPED BASED TRAPPING

BACKGROUND

The subject disclosure is generally directed to trapping on color printers.

Raster type printers, which have been implemented with various print engines such as electrostatographic print engines and ink jet print engines, commonly employ halftoning to transform continuous tone image data to print data that can be printed as an array of dots that can be of substantially similar size. For example, 24 bit/pixel continuous tone image data can be half-toned to 8-bit, 4-bit or one-bit data per pixel per primary color. A frequently encountered problem in color printing is misregistration of the color planes, which can cause objectionable artifacts. For example, when black text is printed on a color background, misregistration of black relative to the other colors can cause a white gap between the black text and the color background. Other kinds of print engine problems, such as trailing edge deletion, where toner at the trailing edge fails to transfer, can cause similar artifacts. Trapping can be used to compensate for these problems by overlapping the colors near the edge so that there is no white gap when misregistration or trailing edge deletion happens. For example, the background color can be added to the black pixels near the black text edge.

DETAILED DESCRIPTION

Figure 1:
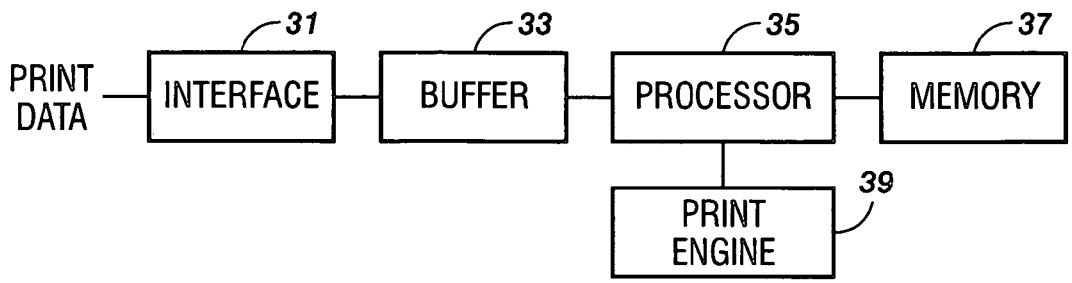
FIG. 1 is a schematic block diagram of an embodiment of a printing system.

FIG. 1 is a schematic block diagram of an embodiment of a printing apparatus that includes an interface 31 that receives print data, for example from a host computer, and stores the print data in a buffer memory 33. A processor 35 is configured to process the print data to produce bit mapped raster data that is stored in a memory 37. A print engine 39 prints an image pursuant to the bit mapped raster data generated by the processor 35. The print engine 39 can be an electrostatographic print engine or an ink jet print engine, for example.

Printing is accomplished by selectively printing, depositing, applying or otherwise forming markings such as dots on a receiver surface or substrate that can be a print output medium such as paper or a transfer surface such as a transfer belt or drum. If a transfer surface is used, the image formed or printed on the transfer surface is appropriately transferred to a print output medium such as paper.

Figure 2:
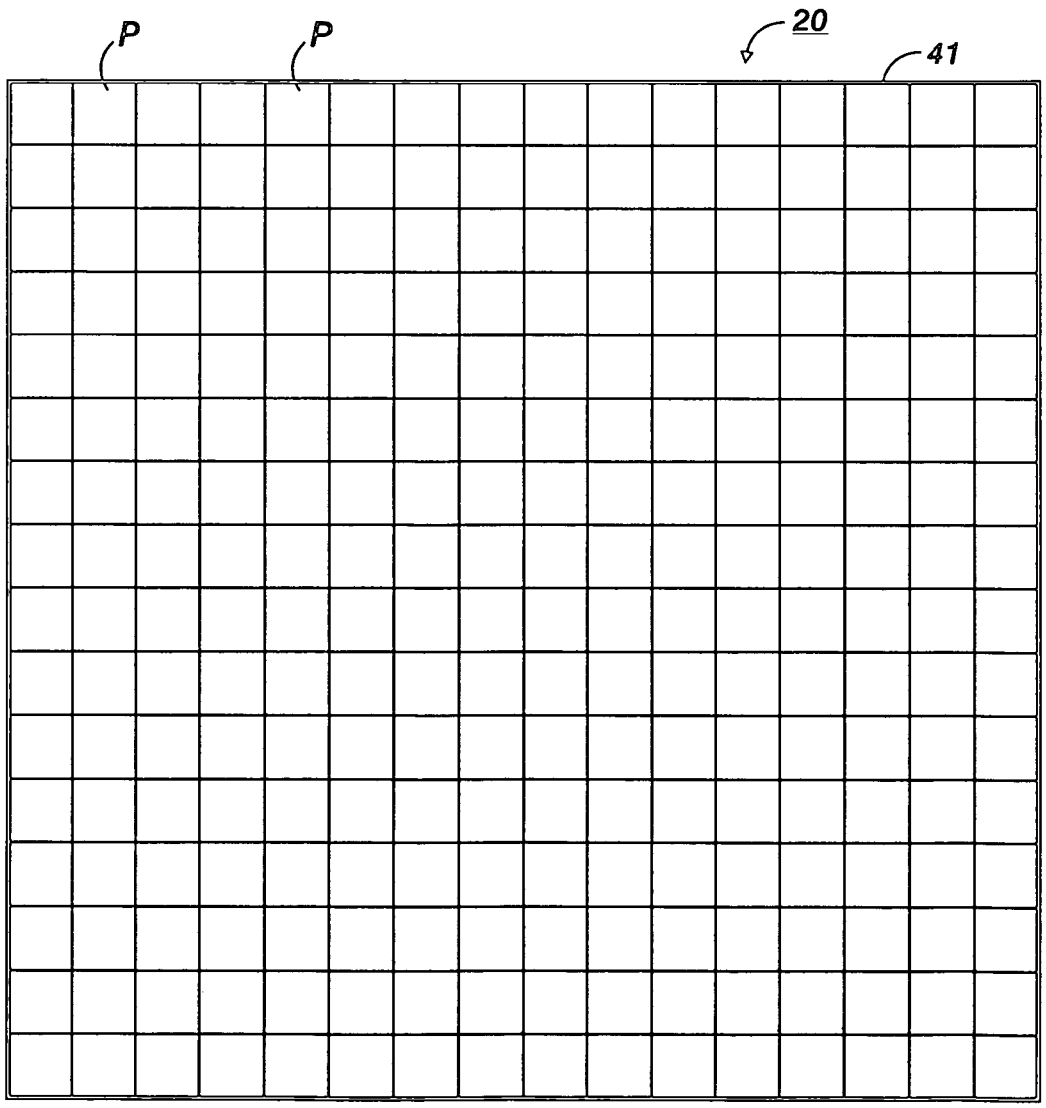
FIG. 2 is a schematic illustration of an embodiment of a pixel array.

FIG. 2 is a schematic illustration of an embodiment of an array 20 of pixel locations P that can be used to define the locations on a print output medium 41 that can be marked or printed. A marking of a particular primary color (e.g., cyan magenta, yellow or black) that is printed or deposited at a pixel location can be conveniently called a dot.

Each pixel location P can, for example, be marked or printed with (a) one or more non-black primary color dots (e.g., cyan, magenta or yellow), (b) a black dot by itself, or (c) a black dot and at least one non-black primary color dot.

Print data typically comprises continuous tone data (such as 32-bit or 24-bit pixel data), and halftoning (e.g., using one or more halftone threshold arrays) is commonly employed to map or transform continuous tone data to half-toned data that describes the primary color or colors, if any, that is/are to be printed at the corresponding output pixel location P. For example, the half-toned data can comprise one bit data per pixel per primary color or multi-bit data per pixel per primary color, wherein the multi-bit data contains fewer bits than the continuous tone data (e.g., eight or four bits).

Pursuant to half-toning, the array 20 more particularly comprises an array or collection of identically shaped halftone cells for each primary color, wherein the half-tone cell configuration for each primary color can be different. Thus, each pixel P can have a different intra-cell location or position in the respective half-tone cells for the different primary colors. A half-tone cell includes a relatively small number of pixels, and each of the half-tone cells for a primary color can have the same fill order. For convenience, pixels having the same intra-cell position or location in a particular primary color half-tone cell array can be referred to as pixels that are correspondingly located in half-tone cells for a primary color.

Figure 3:
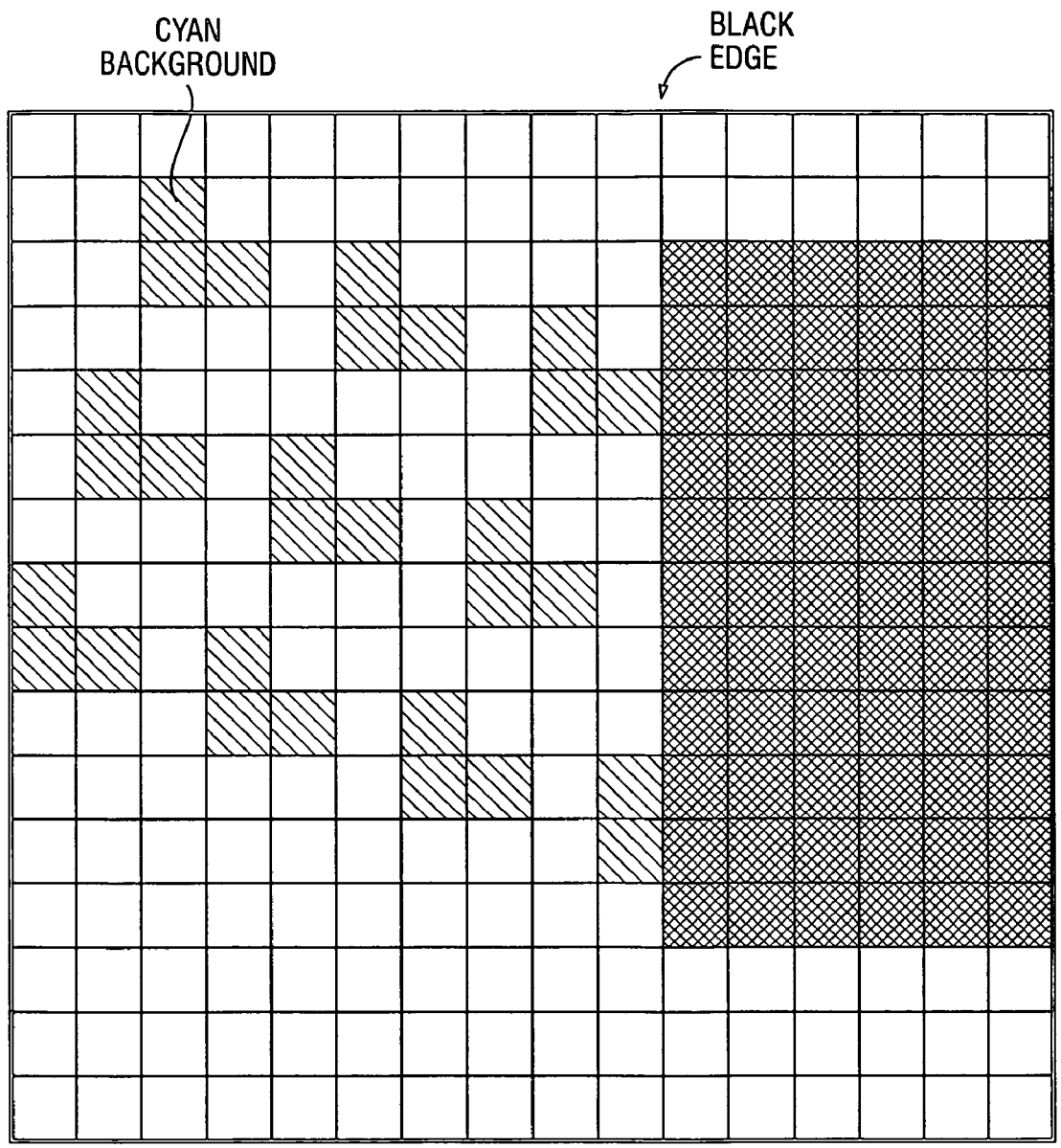
FIG. 3 is a schematic illustration of a black edge on a halftoned cyan background.

FIG. 3 shows a black edge on a half-toned cyan background. When there is misregistration between the cyan and black color planes, a white gap can appear between the cyan halftone dots and the black edge.

Figure 4:
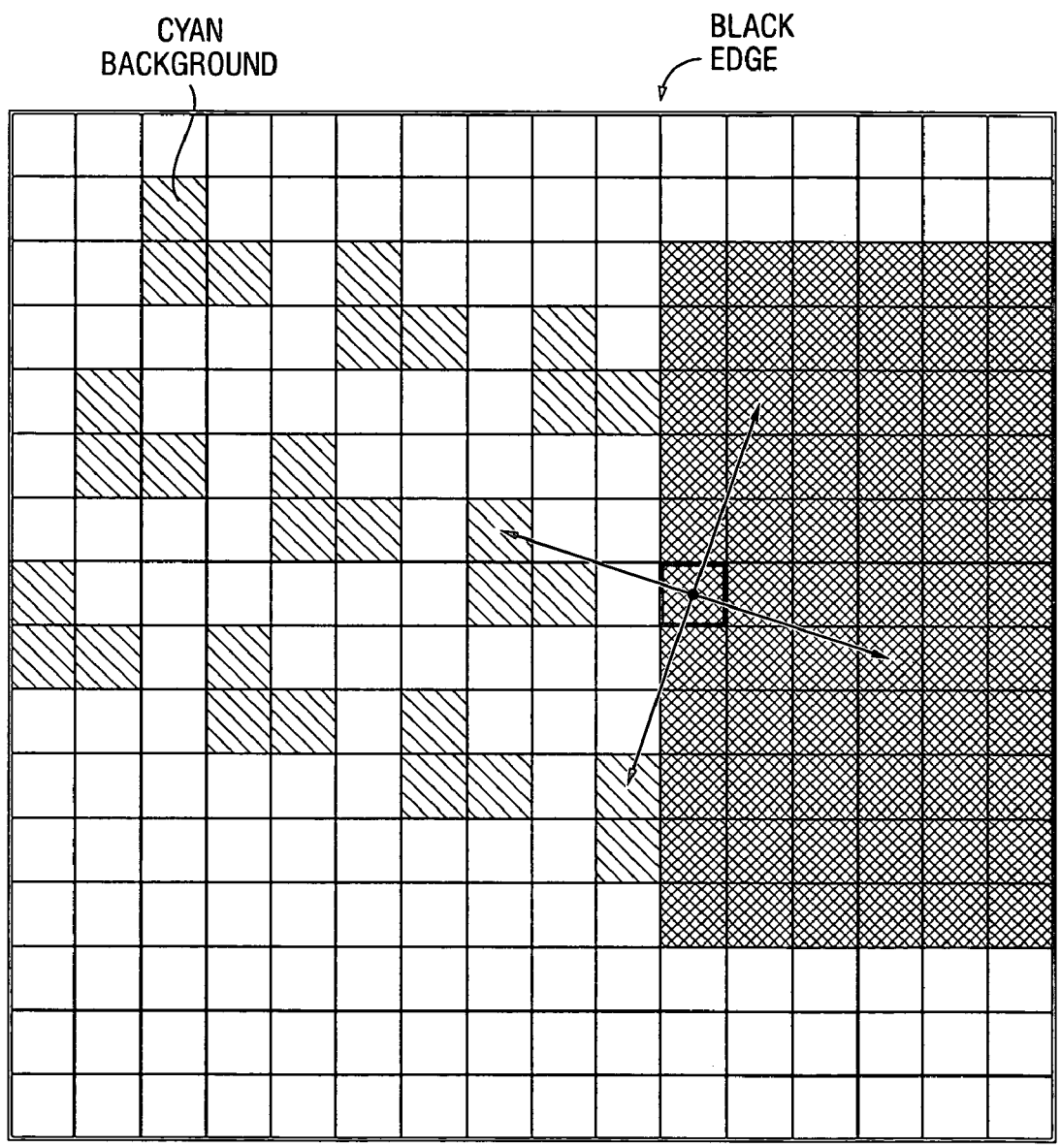
FIG. 4 is a schematic illustration of halftone screen vectors.

FIG. 4 shows illustrative examples of cyan screen vectors originating from a selected pixel that is on the black edge. Screen vectors can be used to locate correspondingly located pixels in neighboring cyan halftone cells.

Figure 5:
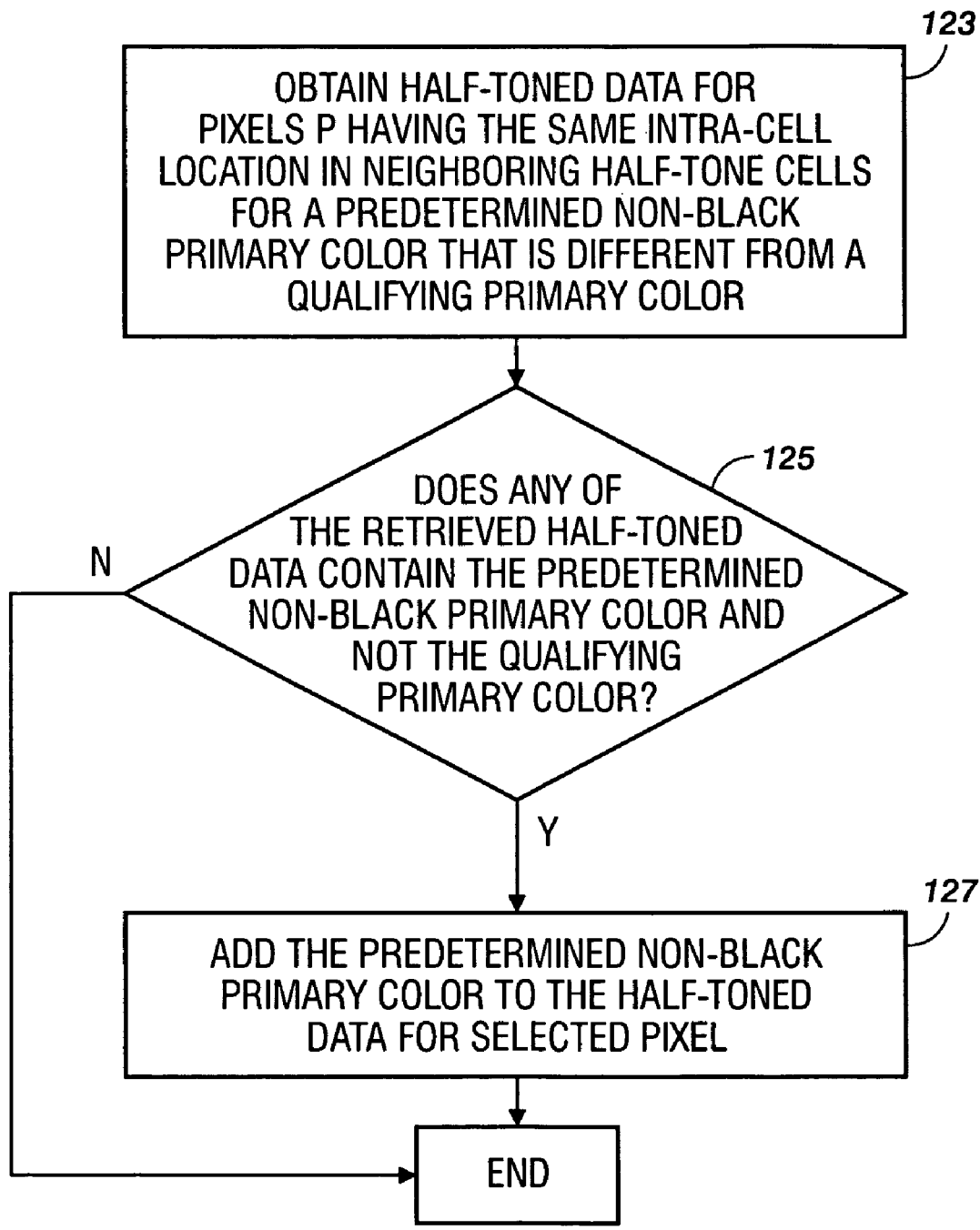
FIG. 5 is a schematic flow diagram of an embodiment of a procedure for modifying half-toned data for a selected pixel.

FIG. 5 sets forth a schematic flow diagram of an embodiment of a procedure modifying half-toned pixel data for a selected pixel. For example, the selected pixel can be one of two adjacent pixels that include only a particular qualifying primary color such as black prior to modification pursuant to this procedure. Additional factors can be used to select a pixel for this procedure. Applying this procedure to selected pixels can reduce the amount of noise that can result from applying the procedure to every pixel.

At 123 half-toned data is obtained for pixels P that have the same intra-cell location as the selected pixel in neighboring half-tone cells of a predetermined non-black primary color that is different from the qualifying primary color and lighter (i.e., less dark) than the qualifying primary color. In other words, the procedure obtains half-toned pixel data for a pixel P in a nearby half-tone cell of the predetermined non-black primary color having the same intra-cell location as the selected pixel. Stated another way, half-toned data is obtained for pixels P in neighboring half-tone cells having the same intra-cell position as the selected pixel P. This can be accomplished for example by employing respective primary color screen vectors or offsets (such as those illustrated in FIG. 4) which point to those pixels in each of the adjoiningly adjacent half-tone cells of the predetermined non-black primary color that have the same intra-cell location in such nearby half-tone cells as the selected pixel; namely pixels that are correspondingly located in neighboring predetermined non-black primary color half-tone cells as the selected pixel. A screen vector can be defined as a vector with the same or opposite angle as a halftone screen angle, with its magnitude determined by the distance of two adjacent halftone cells along the halftone screen angle. Usually a halftone screen has two angles, so there are four screen vectors, two along the halftone screen angles, and two opposite the halftone screen angles. For further away pixels, vectors having the same angles as the screen vectors and magnitudes that are integral multiples of the screen vector magnitudes can be employed.

By way of illustrative example, neighboring half-tone cells for the predetermined non-black primary color can comprise half-tone cells for the predetermined non-black primary color that are adjoiningly adjacent the half-tone cell for the predetermined non-black primary color that contains the selected pixel, wherein a half-tone cell is adjoiningly adjacent if it is a closest cell in one of the screen vector directions.

Alternatively, neighboring half-tone cells can comprise half-tone cells that are separated from the half-tone cell containing the selected pixel by half-tone cells that are adjoiningly adjacent the half-tone cell containing the selected pixel; e.g., half-tone cells that are adjoiningly adjacent those half-tone cells that are adjoiningly adjacent the half-tone cell containing the selected pixel.

Also, neighboring half-tone cells for the predetermined non-black primary color can comprise half-tone cells adjoiningly adjacent the half-tone cell containing the selected pixel as well as half-tone cells adjoiningly adjacent half-tone cells adjacently adjoining the half-tone cell containing the selected pixel.

Generally, neighboring can mean nearby, in the vicinity of, or relatively close to the half-tone cell containing the selected pixel, for example not further than three or four half-tone cells away from the half-tone cell that contains the selected pixel. Also, the selected neighboring half-tone cells can optionally not include the closest half-tone cells. Selection of neighboring half-tone cells to be checked can be based on a variety of factors such as the halftone screen frequency, the degree of misregistration or trailing edge deletion.

At 125 a determination is made as to whether any of the pixel data retrieved at 123 contains the predetermined non-black primary color and does not contain the qualifying primary color.

If the determination at 125 is no, processing ends.

If the determination at 125 is yes, the predetermined non-black primary color is added at 127 to the half-toned data for the selected pixel.

For a qualifying color of black, the foregoing procedure can be employed for a selected pixel for one or more of the non-black primary colors of the printing system, which can comprise for example cyan, magenta and yellow. Such implementation can be advantageously employed for trapping black.

More generally, the foregoing can be employed for general trapping, for example wherein a lighter primary is extended beyond an edge to a darker primary.

Figure 6:
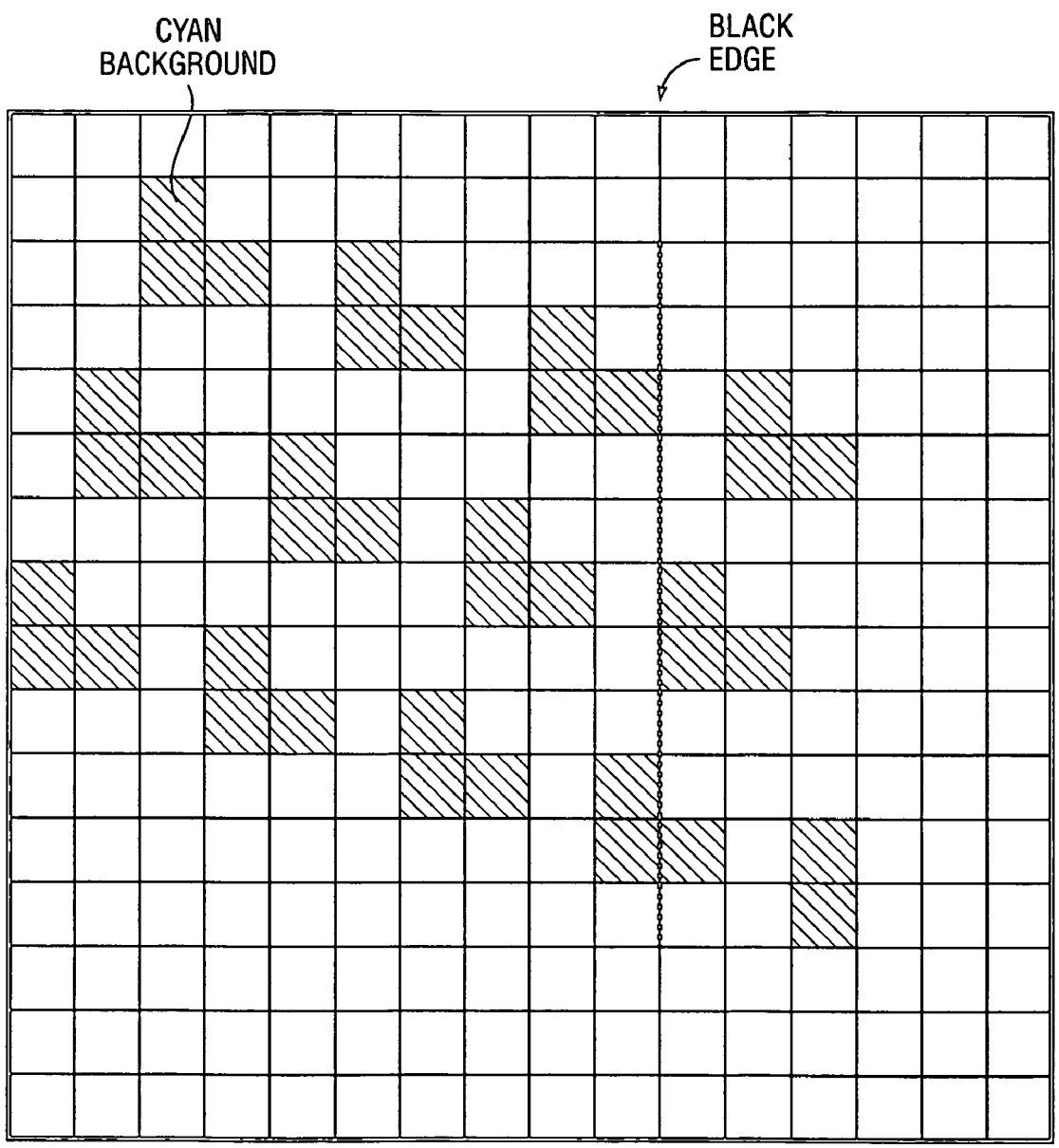
FIG. 6 is a schematic illustration of the cyan bitmap of FIG. 2 after the procedure of FIG. 5 is performed as to selected pixels.

FIG. 6 shows the cyan background of FIG. 3 after the half-tone data for selected pixels have been modified in accordance with the procedure of FIG. 5. For ease of viewing, the black edge is indicated but not shown with the darkened pixels of FIG. 3. As can be seen, the cyan halftone dot pattern has been extended beyond the black edge, which can reduce or eliminate white gaps that may be caused by misregistration between the cyan and black planes, or print engine deficiencies.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A computer operable method of modifying half-toned pixel data for a selected pixel that contains black and does not contain a predetermined non-black primary color, the selected pixel being in a half-tone cell for the predetermined non-black primary color, comprising:
   determining at least one non-black primary color as the predetermined non-black primary color;
   selecting a pixel which contains black and does not contain the predetermined non-black primary color;
   obtaining half-toned data for any pixels in neighboring half-tone cells for the predetermined non-black primary color that have a same intra-cell position as the selected pixel wherein intra-cell position comprises pixels correspondingly located in half-tone cells for the predetermined non-black primary color; and
   if any of the obtained half-toned pixel data contains the predetermined non-black primary color and does not contain black, then modifying the half-toned pixel data for the selected pixel to include the predetermined non-black primary color using a computer processor.

2. The method of claim 1 wherein neighboring said half-tone cells for the predetermined non-black primary color comprise half-tone cells for the predetermined non-black primary color that are adjoiningly adjacent to a half-tone cell for the predetermined non-black primary color that corresponds to a half-tone cell for black containing the selected pixel.

3. The method of claim 1 wherein neighboring said half-tone cells for the predetermined non-black primary color comprise half-tone cells for the predetermined non-black primary color that are separated from a half-tone cell for the predetermined non-black primary color that corresponds to a half-tone cell for black containing the selected pixel by half-tone cells for the predetermined non-black primary color that are adjoiningly adjacent to said half-tone cell for the predetermined non-black primary color that corresponds to the half-tone cell for black containing the selected pixel.

4. The method of claim 1 wherein said obtaining half-toned data for any pixels in neighboring half-tone cells for the predetermined non-black primary color comprises using screen vectors to obtain half-toned data for any pixels in neighboring half-tone cells for the predetermined non-black primary color that have a same intra-cell position as the selected pixel wherein a screen vector is a vector with the same or opposite angles as a half-tone screen angle and with a magnitude determined by a distance of two adjacent half-tone cells along the half-tone screen angle.

5. The method of claim 1 wherein the predetermined non-black primary color comprises cyan.

6. The method of claim 1 wherein the predetermined non-black primary color comprises magenta.

7. The method of claim 1 wherein the predetermined non-black primary color comprises yellow.

8. A computer program which embodies the method of claim 1, the computer program comprising computer-executable instructions represented within a computer readable medium.

9. A method of modifying half-toned pixel data for a selected pixel that contains a first predetermined primary color and does not contain a second predetermined primary color that is both different from the first predetermined primary color and is not black, the selected pixel being in a half-tone cell for the second predetermined primary color, comprising:
   obtaining half-toned data for any pixels in neighboring half-tone cells for the second predetermined primary color that have a same intra-cell position as the selected pixel wherein intra-cell position comprises pixels correspondingly located in half-tone cells for the second predetermined primary color; and if any of the obtained half-toned pixel data contains the second predetermined primary color and does not contain the first predetermined primary color, then modifying the half-toned pixel data for the selected pixel to include the second predetermined primary color using a processor and a buffer memory.

10. The method of claim 9 wherein said neighboring half-tone cells for the second predetermined primary color comprise half-tone cells for the second predetermined primary color that are adjoiningly adjacent to a half-tone cell for the second predetermined primary color that corresponds to a half-tone cell for the first pre-determined primary color containing the selected pixel.

11. The method of claim 9 wherein said neighboring half-tone cells for the second predetermined primary color comprise half-tone cells for the second predetermined primary color that are separated from a half-tone cell for the second predetermined primary color that corresponds to a half-tone cell for the first predetermined primary color containing the selected pixel by half-tone cells adjoiningly adjacent to said half-tone cell for the second predetermined primary color that corresponds to the half-tone cell for the first predetermined primary color containing the selected pixel.

12. The method of claim 9 wherein said obtaining half-toned data for any pixels in neighboring half-tone cells for the second predetermined primary color comprises using screen vectors to obtain half-toned data for any pixels in neighboring half-tone cells for the second predetermined primary color that have a same intra-cell position as the selected pixel wherein a screen vector is a vector with the same or opposite angles as a half-tone screen angle and with a magnitude determined by a distance of two adjacent half-tone cells along the half-tone screen angle.

13. The method of claim 9 wherein the first predetermined primary color comprises cyan.

14. The method of claim 9 wherein the first predetermined primary color comprises magenta.

15. The method of claim 9 wherein the second predetermined primary color comprises cyan.

16. The method of claim 9 wherein the second predetermined primary color comprises magenta.

17. The method of claim 9 wherein the second predetermined primary color comprises yellow.

18. A computer program which embodies the method of claim 9, the computer program comprising computer-executable instructions represented within a computer readable medium.

19. A printing system comprising:

a processor configured to:

obtain half-toned data for any pixels in neighboring half-tone cells for a second predetermined primary color that have a same intra-cell position as a selected pixel having half-toned pixel data that contains a first predetermined primary color and does not contain the second predetermined primary color that is both different from the first predetermined primary color and is not black;

wherein the intra-cell position comprises pixels correspondingly located in half-tone cells for the second predetermined primary color;

modify the half-toned pixel data for the selected pixel to include the second predetermined primary color if any of the obtained half-toned pixel data contains the second predetermined primary color and does not contain the first predetermined primary color;

a print engine for receiving the half-toned pixel data for the selected pixel; and a buffer memory for storing print data and another memory for storing bit mapped raster data.

20. the printing system of claim 19 wherein the first predetermined primary color comprises black.

\* \* \* \* \*